Patented Aug. 22, 1933

1,923,321

UNITED STATES PATENT OFFICE 1,923,321

RESINOUS PRODUCT AND PROCESS OF MAKING SAME

Joseph V. Meigs, Jersey City N. J., assignor, by mesne assignments, to Plastix Corporation, a Corporation of Delaware No Drawing. Application January 15, 1927
Serial No. 161,469

21 Claims. (Cl. 260—2)

This invention relates to resinous bodies derived from carbohydrates and phenols and is in part a continuation of my co-pending application, Serial No. 92,640, filed March 5, 1926, now patent 1,868,215.

One object of the present invention is to provide a resinous body of the type mentioned, possessing an increased resistance in respect to water in liquid or gaseous form, and aqueous solutions. In accomplishing this object, other improvements have been effected, all as will be more fully hereinafter described.

By heating under pressure a fusible carbohydrate-phenol resin (with or without a filling material) with a hardening agent comprising a condensation product of an aldehyde and a weak base, such as hexamethylenetetramine, (sometimes referred to as "hexa"), infusible resinous bodies may be produced. By virtue of the action of the aldehyde hardening agent, the time required for the change from the fusible to the infusible condition is reduced. By suitable manipulation, products may be produced having many of the properties demanded by consumers of molded or pressed articles, that is high mechanical strength, toughness, high dielectric strength heat resistance, and low power loss when used as a dielectric with high frequency currents.

These products as heretofore made have been susceptible to the deteriorating influence of water in liquid or gaseous form. If immersed in water or subjected to a moist atmosphere, the surface gloss disappears, the color is changed from black to brown or yellow, the surface may be more or less softened and a certain amount of water will be absorbed. Moreover the electrical resistance of the surface (insulation resistance) may be decreased.

This effect of water on the infusible resin is apparently due first to the susceptibility to water of the resin constituent of the product and secondly the more pronounced susceptibility of the resin constituent to the weak base, for example ammonia, which is liberated by the treatment of the fusible resin with a hardening agent, as for example, hexa.

The chemical action of ammonia solutions on the resin may readily be observed by immersion of the specimen therein. After exposure for some time in this way, the surface of the resin will in many cases be found to be acted on by the ammonia. Some of the effects of such action are as follows that;

(a) The surface becomes softened.

(b) The color of the surface changes from black to lighter colors, e. g., dark brown, light brown, grey, or yellow grey.

(c) The surface loses its luster, and, if exposed for a sufficient length of time, becomes disintegrated into a pulverulent product.

It is probable that the susceptibility to ammonia is due to the presence of humic or levulinic acid, or both, in the carbohydrate resin. It is well known that humic acid, humic substances and levulinic acid are formed by heating carbohydrates with certain solutions of mineral acids. Humic and levulinic acids form water soluble ammonium salts and react readily with many basic substances.

While the above discussion is concerned chiefly with ammonia and its action, similar effects may be observed with other weak bases. Strong bases, such as sodium hydroxide, have a more pronounced effect and may entirely dissolve a carbohydrate-phenol resin.

I have found that I can, by suitable treatment, greatly increase the resistance of a carbohydrate-phenol resin toward ammonia and other weak bases. Then, by subsequently heating such an ammonia resistant product with the condensation product of an aldehyde and a weak base, as for example, hexamethylenetetramine, I can prepare a final product that possesses a greatly increased resistance in respect to moisture or water, in addition to other valuable properties, such as high mechanical strength, high electrical resistance, dielectric strength, and permanent luster.

In practicing the present invention any fusible carbohydrate-phenol resin may be used, but I prefer to use resins produced as described in my United States Patent 1,593,342, patented July 20, 1926, and in my co-pending application 92,640, filed March 5, 1926. I may also use a resin made from a starch, as, in some cases at least, such a resin may be rendered resistant to ammonia with somewhat greater ease than is the case with resins prepared from sugars.

To effect the desired conversion into an ammonia resistant product the resin, for example, the fusible resin, of my patent and application referred to is heated and the temperature gradually increased. It is preferably carried above 200° centigrade and maintained at say 240° to 270° centigrade until the desired resistance to ammonia is secured. If infusibility should develop prior to securing the necessary conversion, a high boiling solvent as hereinafter described, may be employed to dissolve and render liquid such infusible product. During such heating volatile products may be and generally are evolved. These may include water, formic acid, phenol and sometimes carbon dioxide. The evolution of such volatile products causes foaming and the heating should be so regulated as to prevent this foaming from getting beyond control. Where the resin was made by employing sulphuric acid as a catalyst, sulphur dioxide will be evolved unless the sulphuric acid has been neutralized.

Temperatures lower or higher than 240° to 270° centigrade may be used depending on the particular resin employed. It is necessary to employ only such heating as will effect the necessary conversion. Ordinarily heating to 240 degrees to 270 degrees centigrade for about an hour will render the product sufficiently resistant.

The resistance to ammonia brought about by such heating may be qualitatively determined by cooling the product and immersing it in aqueous ammonia for, let us say, twelve hours, observing the effects, and comparing with the effects observed in the case of a sample of resin before its heat treatment. If the necessary conversion has been effected, the action of the ammonia solution will produce only a relatively slight loss of surface luster and hardness, or better, none at all. If this is not the case, then further heating should be employed, preferably at high temperatures, until the necessary degree of resistivity is obtained.

This resistant product is then mixed with hexamethylenetetramine or other suitable hardening agent, e. g., anhydro-formaldehyde aniline, and heated under pressure to form a final product that is resistant to moisture and water. In addition to hexamethylenetetramine or its equivalent, filling, extending or supporting material in comminuted or sheet form may be incorporated by any of the well known methods.

The invention may be practiced in any of the following illustrative forms. These are presented for illustrative purposes only and are not to be construed as imposing limitations.

*Example 1.*—Continue the heat treatment until the product becomes resistant to ammonia, or infusible but is still capable of being wholly or partially dissolved in a suitable solvent, e. g., alcohol, alcohol and acetone or alcohol and benzol. (By infusibility I do not necessarily mean the property of being rigid at high temperatures, that is, heat rigidity or heat-set. The term infusibility as herein used includes the condition of partial or complete jellification of the previously liquid resin characterized by very high viscosity and comparatively low ductility, at high temperatures. It may also be characterized by a rubbery or slightly resilient consistency at elevation temperatures.) Dissolve the cooled product in a volatile solvent to make a varnish together with hexamethylenetetramine or its equivalent. The varnish may be employed in any known manner.

*Example 2.*—Proceed as in Example 1 above and instead of using a volatile solvent, use a high boiling solvent, as for example, anthracene oil, the higher fractions of creosote oil, chlorinated napthalene, or dibutyl phthalate. By heating the ammonia resistant resin with, say, 10 to 30 per cent by weight of anthracene oil, a solid solution may be obtained, comprising an infusible carbohydrate resin dissolved in a high boiling solvent. Such a solution is readily fusible and easily incorporated with fillers and hardening agents on hot differential rolls. It is also readily soluble in suitable volatile solvents, such as alcohol, alcohol and acetone, or alcohol and benzol, to make a varnish to which hexa or its equivalent may be added.

*Example 3.*—Carry out the heat treatment as in Example 1 above, in the presence of a high boiling solvent, as for example the fraction of anthracene oil boiling above 300 degrees centigrade. From 10 to 40 per cent of such solvent may, for example, be used. This is somewhat easier to practice than the process described in Example 2. It has the further advantage that the heating may be continued with no danger of infusibility or solidification developing, with consequent risk of overheating or burning.

The following is a typical and more specific illustration:

*Example 4.*—A resin was selected made by heating 1,600 grams of starch with 4,000 grams of phenol and 63 grams of sulphuric acid, sp. gr. 1.83, and eliminating about 867 grams of water and about 800 grams of phenol. These ingredients were heated in a vessel having an air cooled reflux condenser and a downwardly inclined water cooled condenser leading from the top of the air cooled condenser. The water was distilled off as formed, carrying with it a small proportion of phenol. Most of the phenol was refluxed. The temperature was gradually raised until water ceased to be freely evolved, corresponding to a temperature of about 180 degrees centigrade. The heating was then continued under a vacuum until the above noted quantity of phenol was eliminated. 800 grams of the resulting fusible resin together with 190 grams of a high boiling distillate (consisting of the residue of wood preservers' coal tar creosote oil boiling above 300 degrees centigrade) were heated at atmospheric pressure to 250 degrees centigrade and maintained at that temperature for three hours. In the absence of the high boiling solvent the resin alone might, under the same conditions, have become quite infusible. However, the product obtained was fusible and soluble in alcohol, or alcohol and acetone. It consisted of a black resin, liquid when hot, solid when cooled, and possessing a high surface luster. The surface hardness and gloss were little, if at all, affected by soaking in a 15 per cent aqueous ammonia solution for twelve hours. One hundred parts by weight of the resin referred to were mixed with twelve parts by weight of hexamethylenetetramine and one hundred and twelve parts by weight of wood flour and the mixture molded in a closed mold at about 170 degrees centigrade. The resulting product was heat-set (heat-hardened; thermo-rigid). It possessed a high gloss, and was decidedly resistant in respect to water and moisture.

In accomplishing the object of producing an ammonia resistant resin capable of yielding moisture and water resistant products when further heated with a hardening agent comprising an aldehyde and a weak base, as for example hexamethylenetetramine, I have incidentally made other improvements. Such improvements are concerned especially with the use of the high boiling solvent and the heat treatment hereinabove described.

The invention is not limited to the use of such solvent as I may carry out the heat treatment, (in order to obtain a resin resistant to ammonia or other weak bases), without a solvent.

The primary object in employing the high boiling solvent is to provide a means for obtaining a resin with such properties as will enable it to be more easily mixed or otherwise incorporated with filling, extending or supporting material, than would be the case without the presence of the solvent, in order to obtain a composite product of a sufficiency "plastic" character to be well adapted for the various molding or pressing operations commonly applied to such material at the present time. When a carbohydrate resin is heated as herein described for the purpose of rendering it more resistant to ammonia or other weak bases, the resin may also become less readily soluble in volatile solvents and less "plastic", i. e., more viscous, and less capable of readily "flowing" or assuming the shape of a mold. Increase in viscosity may also be accompanied by a decrease in solubility, or rate of solubility in volatile solvents so that as a result, the preparation of suitable varnishes for liquid coating or impregnating purposes may be rendered more difficult.

The use of a suitable high boiling solvent as herein described overcomes these difficulties. By the use of such suitable solvents, I can prepare products which may be heated to very high temperatures and which will be nevertheless, subsequent to such heating, very "plastic" when subjected to the usual molding or pressing operations, and soluble in solvents, such as alcohol, which are used in making varnishes.

The nature of the changes that take place when a carbohydrate-phenol resin becomes resistant to ammonia by heating as herein described is not clearly known.

Possibly humic acid and levulinic acid are altered or decomposed. Condensation and polymerization may occur.

It is also possible that when such changes take place in the presence of a suitable high boiling solvent, reaction may occur between the resin and solvent, perhaps not a strictly chemical reaction but, let us say a physico-chemical change. This is indicated by my observations.

In the typical illustration described above, 800 grams of a carbohydrate-phenol resin were heated with 190 grams of a high boiling creosote oil residue. Notwithstanding the comparatively large proportion of solvent, the product was apparently harder than the original resin and also appeared to be considerably tougher.

Among high boiling solvents, I have found that certain semi-solid or waxy distillates from coal tar are especially suitable.

When coal tar is distilled to produce hard pitch some of the higher boiling fractions, e. g., those with a boiling point of 250 degrees centigrade and upwards, are semi-solid or waxy in character. They contain substances such as phenanthrene, pyrene, fluorene, anthracene and many other bodies having condensed benzene and heterocyclic groups in their structure.

With some of these substances a reaction with carbohydrate-phenol resins might be predicted on theoretical grounds.

In addition to these or other substances, I may also employ the polymerization products of coumarone and indene known as coumarone resins.

By the term "high boiling solvent" I mean a solvent which will not vaporize to an undesirable extent when the resin is heated to the temperatures necessary to render it resistant to ammonia or other weak base, or to the temperatures ordinarily used in the molding, pressing or baking operations for which the resin is employed.

It will be observed that the improvement constituting my invention may be utilized in several different ways; the fusible resin may be heated without a solvent and without making it infusible to render it less susceptible to ammonia or other weak base; it may be heated with a solvent to such an extent that it is only the presence of the solvent which prevents the product from becoming infusible, the resin in such case being in effect infusible but kept in a "plastic" condition by the solvent; it may be heated without the solvent to infusibility in which case it will be necessary to use very high pressures for molding or pressing. In any case the product so obtained may be further heated with an agent comprising a condensation product of an aldehyde and a weak base, as for example hexamethylenetetramine, to produce a final product possessing a high degree of mechanical strength and toughness, electrical resistance and dielectric strength, heat resistance and in addition to these qualities the property of being resistant toward water.

What I claim is:

1. The process which comprises heating an already formed carbohydrate-phenol resin until it becomes resistant to ammonia and thereafter reacting the same with hexamethylenetetramine.

2. Process of treating a phenol-carbohydrate resin which comprises heating the resin while in the fusible stage to a temperature between 240 degrees and 270 degrees centigrade in the presence of a solvent boiling above 270° C. and under conditions permitting distillation of volatile ingredients until the product is resistant to ammonia and then incorporating with the product hexamethylenetetramine, and subjecting it to heat and pressure.

3. The process which comprises heating a carbohydrate with a phenol and sulphuric acid, distilling off water and obtaining a resin containing combined and free phenol amounting to about twice the weight of carbohydrate used, then heating further to temperatures between 200 and 300 degrees centigrade and obtaining a fusible resin resistant to ammonia and finally heating such fusible resin with hexamethylenetetramine and obtaining a mechanically strong water-resistant product.

4. Process of making a carbohydrate resin which will be substantially unaffected by contact with water which comprises heating a carbohydrate, a phenol and sulphuric acid until a fusible resin has been produced, and heating the fusible resin thus produced to a temperature above 200° centigrade, under pressure not substantially in excess of atmospheric pressure.

5. Process of making a carbohydrate resin which will be substantially unaffected by contact with water which comprises heating a carbohydrate, a phenol and an acid catalyst until a fusible resin has been produced, and heating the fusible resin thus produced to a temperature above 200° centigrade, under pressure not substantially in excess of atmospheric pressure.

6. Process of making a carbohydrate resin which will be substantially unaffected by contact with water which comprises heating a starch, a phenol and an acid catalyst until a fusible resin has been produced, and heating the fusible resin thus produced to a temperature above 200° centigrade, under pressure not substantially in excess of atmospheric pressure.

7. Process of making a carbohydrate resin which will be substantially unaffected by contact with water which comprises heating a carbohydrate, a phenol and an acid catalyst until a fusible resin has been produced, and heating the fusible resin thus produced to a temperature above 200° centigrade in the presence of a solvent for the resin non-volatile at said temperature, under pressure not substantially in excess of atmospheric pressure.

8. Process of making a carbohydrate resin which will be substantially unaffected by contact with water, which comprises heating a carbohydrate, a phenol and an acid catalyst to temperatures which are gradually increased to a temperature of about 180° centigrade while permitting the distillation of volatile substances, and continuing the heating under vacuum to eliminate excess phenol and then heating the reaction product to temperatures between 200° and 300° centigrade under pressure not substantially in excess of atmospheric and in the presence of a solvent which is non-volatile at the temperature to which the resin is thus heated.

9. Process of treating a fusible, soluble resinous material produced by the reaction of a carbohydrate with a phenol which comprises heating said resinous material in the presence of a solvent for the same, non-volatile at the temperature to which the material is heated, with elimination of volatile substances until the material becomes ammonia resistant.

10. Process of treating a fusible, soluble resinous material produced by the reaction of a carbohydrate with a phenol for the purpose of making the product water resistant which comprises heating said resinous material to a temperature above 200° C. with elimination of volatile substances, and thereafter reacting the same with hexamethylenetetramine.

11. Process of treating a fusible, soluble resinous material produced by the reaction of a carbohydrate with a phenol which comprises heating said resinous material, with elimination of volatile substances until it becomes ammonia resistant, and thereafter reacting the same with hexamethylenetetramine.

12. Process of treating a fusible soluble resinous material produced by the reaction of a carbohydrate with a phenol which comprises heating said resinous material in the presence of a solvent for the same, non-volatile at the temperature to which the material is heated, with elimination of volatile substances until the material becomes ammonia resistant, and thereafter reacting the same with hexamethylenetetramine.

13. The process which comprises heating a carbohydrate-phenol resin after the reaction between the carbohydrate and phenol has been completed and a resin is formed, to a temperature of 200° C. or above in the presence of a solvent non-volatile at such temperature until the product becomes resistant to ammonia.

14. A resinous substance consisting of an ammonia-resistant carbohydrate-phenol resin produced by the aid of an acid catalyst, which has been heated in the presence of and contains a solvent boiling above 150° C.

15. A resinous substance, resistant to water and to ammonia, consisting of a carbohydrate-phenol resin produced by the aid of an acid catalyst, which has been heated, in an operation subsequent to that in which the carbohydrate and phenol were reacted, to a temperature above 200° C.

16. A resinous substance consisting of hexamethylenetetramine combined with an ammonia-resistant carbohydrate-phenol resin produced by the aid of an acid catalyst, which has been heated, in an operation subsequent to that in which the carbohydrate and phenol were reacted, to a temperature above 200° C.

17. A resinous substance consisting of a carbohydrate-phenol resin produced by the aid of an acid catalyst, made ammonia resistant by heating after reaction between the carbohydrate and phenol has been completed, and a condensation product of formaldehyde and ammonia.

18. A resinous substance consisting of a carbohydrate-phenol resin produced by the aid of an acid catalyst, made ammonia resistant by heating after reaction between the carbohydrate and phenol has been completed in the presence of a solvent for said resin non-volatile at the temperature at which the resin is heated, and a condensation product of formaldehyde and ammonia.

19. A resinous substance, resistant to water and to ammonia, consisting of a carbohydrate-phenol resin produced by the aid of an acid catalyst, which has been heated to above 200° C. in the presence of and which contains a solvent having a boiling point above said heating temperature.

20. The product which consists of infusible, hard, mechanically strong, water resistant resinous material consisting of the reaction product of a methylene hardening agent and a substantially ammonia resistant carbohydrate-phenol resin produced by the aid of an acid catalyst and made ammonia resistant by heating after the reaction between the carbohydrate and phenol has been completed.

21. A substantially non-hygroscopic resinous material consisting of the reaction products of hexamethylenetetramine and a substantially ammonia-resistant carbohydrate-phenol resin produced by the aid of an acid catalyst and made ammonia resistant by heating after the reaction between the carbohydrate and phenol has been completed.

JOSEPH V. MEIGS.